United States Patent
Chen et al.

(10) Patent No.: US 9,367,159 B2
(45) Date of Patent: Jun. 14, 2016

(54) CONTROL METHOD, DISPLAY DEVICE AND ELECTRONIC SYSTEM UTILIZING THE SAME

(75) Inventors: Yu-Jen Chen, Pingtung County (TW); Chen-Wei Lin, Kaohsiung (TW); Chen-Pang Kung, Jhongli (TW)

(73) Assignee: Industrial Technology Research Institute, Hsinchu (TW)

( * ) Notice: Subject to any disclaimer, the term of this patent is extended or adjusted under 35 U.S.C. 154(b) by 1383 days.

(21) Appl. No.: 12/898,636

(22) Filed: Oct. 5, 2010

(65) Prior Publication Data

US 2011/0090160 A1    Apr. 21, 2011

(30) Foreign Application Priority Data

Oct. 16, 2009    (TW) ................. 98135052 A (51) Int. Cl.
*G06F 3/041*    (2006.01)
(52) U.S. Cl.
CPC .................. *G06F 3/0412* (2013.01)
(58) Field of Classification Search
CPC ....................................... G06F 3/041
USPC .......... 345/173–179; 178/18.01–18.11, 19.01
See application file for complete search history.

(56) References Cited

U.S. PATENT DOCUMENTS

| 8,325,130 | B2 * | 12/2012 | Nam ............................. 345/107 |
| 8,537,126 | B2 * | 9/2013 | Yousefpor et al. ............. 345/173 |
| 8,546,705 | B2 * | 10/2013 | Chang et al. ................ 178/18.06 |
| 2002/0039097 | A1 | 4/2002 | Fujiwara |
| 2003/0058213 | A1 | 3/2003 | Okada |
| 2006/0033011 | A1 * | 2/2006 | Choi et al. .................. 250/208.2 |
| 2006/0119706 | A1 | 6/2006 | An |
| 2008/0180399 | A1 * | 7/2008 | Cheng ........................... 345/173 |
| 2009/0179851 | A1 | 7/2009 | Kwon et al. |

FOREIGN PATENT DOCUMENTS

| EP | 1014332 B1 | 2/2008 |
| TW | 523723 | 3/2003 |
| TW | 529011 | 4/2003 |
| TW | M359769 | 6/2009 |
| TW | I312977 B | 8/2009 |

OTHER PUBLICATIONS

Office Action of corresponding TW application, issued on Aug. 26, 2013.

* cited by examiner

*Primary Examiner* — Kent Chang
*Assistant Examiner* — Scott Au
(74) *Attorney, Agent, or Firm* — Wang Law Firm, Inc.

(57) ABSTRACT

A display device including a display circuit, a touch panel, a detection circuit, and a sensing circuit is disclosed. The display circuit generates a plurality of driving signals. The touch panel displays an image according to the driving signals. The detection circuit detects the display circuit. When the display circuit stops generating the driving signals, the detection circuit asserts a control signal. The sensing circuit detects the touch panel to obtain whether an area of the touch panel is touched when the control signal is asserted.

37 Claims, 5 Drawing Sheets

CONTROL METHOD, DISPLAY DEVICE AND ELECTRONIC SYSTEM UTILIZING THE SAME

CROSS REFERENCE TO RELATED APPLICATIONS

This application claims priority of Taiwan Patent Application No. 098135052, filed on Oct. 16, 2009, the entirety of which is incorporated by reference herein.

BACKGROUND OF THE DISCLOSURE

1. Technical Field

The disclosure relates to a display device with a touch function.

2. Description of the Related Art

With the development of technology, input devices for electronic products have achieved great diversity. In various input devices, touch panels are widely used in the display arrays of liquid crystal displays (LCDs), thus, the capability to input data via the display panel of an LCD. When touch panels are utilized for data input, conventional input devices, such as keyboards and mice, are eliminated, thus, usable space is increased.

In various electronic products, such as a personal digital assistants (PDAs), notebook computers (NBs), personal computers (PC), and mobile phones, touch panels serve as the main input devices and are gradually replacing conventional input devices.

SUMMARY

A display device is provided. An exemplary embodiment of a display device comprises a display circuit, a touch panel, a detection circuit, and a sensing circuit. The display circuit generates a plurality of driving signals. The touch panel displays an image according to the driving signals. The detection circuit detects the display circuit. When the display circuit stops generating the driving signals, the detection circuit asserts a control signal. The sensing circuit detects the touch panel to obtain whether an area of the touch panel is touched when the control signal is asserted.

A control method for a touch panel is provided. An exemplary embodiment of a control method for a touch panel is described. A plurality of driving signals is generated and provided to the touch panel. The touch panel displays a corresponding image according to the driving signals. The driving signals are generated by a display circuit. The display circuit determines whether to stop generating the driving signals. An area of the touch panel is determined whether it has been touched when the display circuit stops generating the driving signals.

Electronic systems are also provided. An exemplary embodiment of an electronic system comprises a host unit and a display device. The host unit provides an image signal. The display device comprises a display circuit, a touch panel, a detection circuit, and a sensing circuit. The display circuit generates a plurality of driving signals according to the image signal. The touch panel displays an image according to the driving signals. The detection circuit detects the display circuit. When the display circuit stops generating the driving signals, the detection circuit asserts a control signal. The sensing circuit detects the touch panel and transmits the detection result to the host unit when the control signal is asserted. The host unit executes a corresponding function according to the detection result.

A detailed description is given in the following embodiments with reference to the accompanying drawings.

BRIEF DESCRIPTION OF THE DRAWINGS

The disclosure can be more fully understood by referring to the following detailed description and examples with references made to the accompanying drawings, wherein.

DETAILED DESCRIPTION OF THE DISCLOSURE

The following description is of the contemplated mode of carrying out the disclosure. This description is made for the purpose of illustrating the general principles of the disclosure and should not be taken in a limiting sense. The scope of the disclosure is determined by reference to the appended claims.

Figure 1:
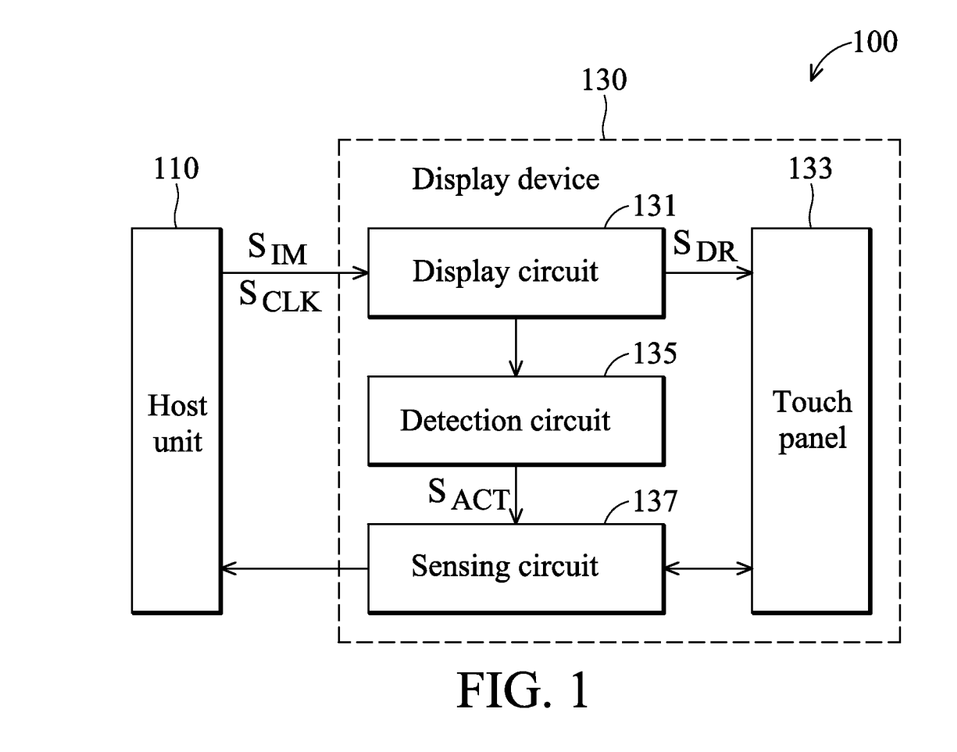
FIG. 1 is a schematic diagram of an exemplary embodiment of an electronic system of the disclosure.

FIG. 1 is a schematic diagram of an exemplary embodiment of an electronic system of the disclosure. The electronic system 100 comprises a host unit 110 and a display device 130. In this embodiment, the display device 130 is a display device with a touch function. The host unit 110 provides an image signal $S_{IM}$ and a clock signal $S_{CLK}$ to the display device 130. The display device 130 display a corresponding image according to the image signal $S_{IM}$ and the clock signal $S_{CLK}$.

When an area of the display device 130 is touched, the display device 130 transmits information of the touched area to the host unit 110. The host unit 110 executes a corresponding function according to the information provided by the display device 130. In this embodiment, the display device 130 comprises a display circuit 131, a touch panel 133, a detection circuit 135, and a sensing circuit 137.

The display circuit 131 provides driving signals $S_{DR}$ according to the image signal $S_{IM}$. The touch panel 133 displays the corresponding image according to the driving signals $S_{DR}$. The detection circuit 135 detects the display circuit 131. When the display circuit 131 stops providing the driving signals $S_{DR}$, the detection circuit 135 asserts a control signal $S_{ACT}$.

When the control signal $S_{ACT}$ is asserted, the sensing circuit 137 detects the touch panel 133 and transmits a detection result to the host unit 110. The detection result is utilized to determine whether the touch panel is touched. If the touch panel is touched, the touched position can be obtained according to the detection result of the sensing circuit 137.

When the driving circuit 131 stops generating the driving signals $S_{DR}$, the sensing circuit 137 detects the touch panel 133. The period in which the sensing circuit 137 detects the touch panel 133 does not overlap the period in which the display circuit 131 generates the driving signals to the touch panel 133. Accordingly, the detection result of the sensing circuit 137 is not influenced by coupled noise, which is generated when the display circuit 131 generates the driving signals to the touch panel 133.

Figure 2:
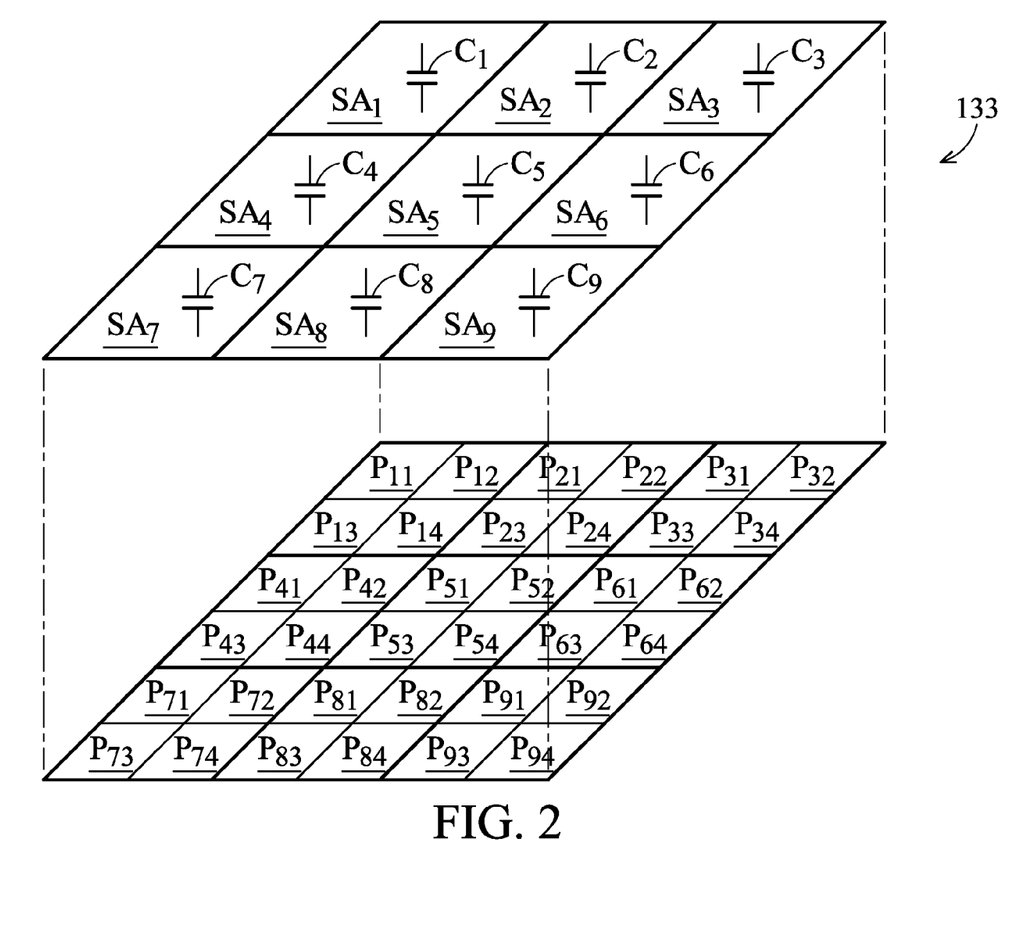
FIG. 2 is a schematic diagram of an exemplary embodiment of a touch panel of the disclosure.

FIG. 2 is a schematic diagram of an exemplary embodiment of a touch panel of the disclosure. The touch panel 133 comprises sensing areas $SA_1$~$SA_9$ and pixel units $P_{11}$~$P_{94}$.

The disclosure does not limit the number of sensing areas $SA_1 \sim SA_9$ and the number of pixel units $P_{11} \sim P_{94}$. In this embodiment, only nine sensing areas $SA_1 \sim SA_9$ and thirty-six pixel units are shown, but the disclosure is not limited thereto. In other embodiments, the number of the sensing areas $SA_1 \sim SA_9$ and the number of the pixel units $P_{11} \sim P_{94}$ can be any number.

In this embodiment, one sensing area corresponds to four pixel units, but the disclosure is not limited thereto. The disclosure does not limit the corresponding relationship between the sensing areas and the pixel units. In other embodiments, one sensing area corresponds to at least one pixel unit.

The disclosure does not limit the arrangement of relationships between the sensing areas and the arrangement of relationships of the pixel units. In this embodiment, the sensing areas are arranged to form one array, and the pixel units are arranged to form another array. In other embodiment, other methods (e.g. a delta method) are utilized to arrange the sensing areas and the pixel units.

Each of the sensing areas $SA_1 \sim SA_9$ comprises a sensor. When a sensing area of the touch panel 133 is touched, the electric property of a portion of the sensors is changed. A portion of the sensors corresponds to the touched sensing area. The sensing circuit 137 obtains the position of the touched sensing area according to the changed level of the electric property.

In one embodiment, the sensors of the sensing areas $SA_1 \sim SA_9$ are integrated into a film. The film comprising the sensors is disposed on a display panel, which does not include a touch function. Accordingly, the display panel can comprise the touch function. In another embodiment, a plurality of sensors are directly integrated into the pixel units $P_{11} \sim P_{94}$ to form a touch panel during manufacture of the pixel units $P_{11} \sim P_{94}$.

In this embodiment, the sensors of the sensing areas $SA_1 \sim SA_9$ are capacitors $C_1 \sim C_9$. The sensing circuit 137 determines whether one of the sensing areas $SA_1 \sim SA_9$ is touched according to the capacitances of the capacitors $C_1 \sim C_9$. For example, if the sensing area $SA_5$ is touched by an object (e.g. fingers or a touch pen), the capacitance of the capacitor $C_5$ is changed. Thus, the sensing circuit 137 is capable of obtaining the touched sensing area according to the capacitances of the capacitors $C_1 \sim C_9$.

In other embodiments, the sensors of the sensing areas $SA_1 \sim SA_9$ are resistors. The sensing circuit 137 detects the voltage differences of the resistors to obtain the touched sensing area.

In one embodiment, the sensing circuit 137 detects all electric properties of the sensors of the sensing areas $SA_1 \sim SA_9$ each time. In other embodiments, the sensing circuit 137 detects at least one of the electric properties of the sensors of the sensing areas $SA_1 \sim SA_9$ each time.

The disclosure does not limit the number of the sensing areas detected by the sensing circuit 137 each time. The disclosure does not limit the sequence used for detecting the sensing areas detected by the sensing circuit 137 each time. The sensing circuit 137 sequentially or non-sequentially detects the sensing areas $SA_1 \sim SA_9$. In this embodiment, the sensing circuit 137 detects three sensing areas each time.

For example, the sensing circuit 137 first detects the electric properties of the sensors of the sensing areas $SA_1 \sim SA_3$ during a first period. The sensing circuit 137 then detects the electric properties of the sensors of the sensing areas $SA_4 \sim SA_6$ during a second period. The sensing circuit 137 finally detects the electric properties of the sensors of the sensing areas $SA_7 \sim SA_9$ during a third period.

As shown in FIG. 2, the touch panel 133 comprises pixel units $P_{11} \sim P_{94}$. Each pixel unit comprises a luminous element. In one embodiment, the luminous element is a light-emitting diode (LED), such as an organic LED. In another embodiment, each pixel unit comprises a liquid crystal component, such as a cholesteric liquid crystal.

Figure 3:
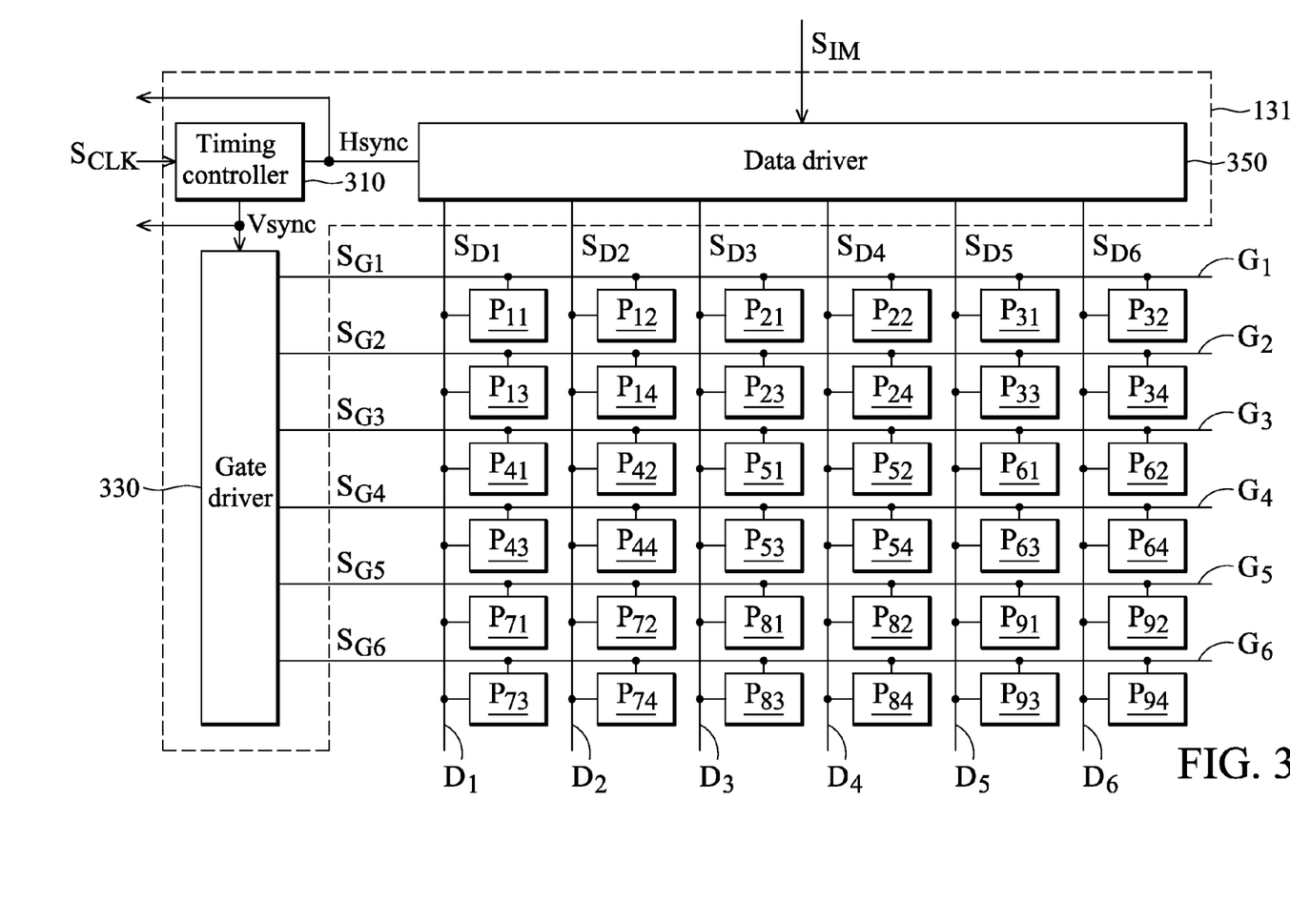
FIG. 3 is a schematic diagram of an exemplary embodiment of a display circuit of the disclosure.

FIG. 3 is a schematic diagram of an exemplary embodiment of a display circuit of the disclosure. The display circuit 131 comprises a timing controller 310, a gate driver 330, and a data driver 350.

In this embodiment, the timing controller 310 generates a vertical synchronization signal Hsync and a horizontal synchronization signal Vsync according to the clock signal $S_{CLK}$. The display circuit 131 generates the driving signals $S_{DR}$ according to the vertical synchronization signal Hsync and the horizontal synchronization signal Vsync. Accordingly, the detection circuit 135 determines whether the display circuit 131 stops generating the driving signals $S_{DR}$ according to one or a combination of the vertical synchronization signal Hsync and the horizontal synchronization signal Vsync.

The gate driver 330 provides a plurality of scan signals to a plurality of gate lines according to the horizontal synchronization signal Vsync. The disclosure does not limit the number of the gate lines. For the pixel units $P_{11} \sim P_{94}$ shown in FIG. 2, FIG. 3 shows six gate lines $G_1 \sim G_6$ and six scan signals $S_{G1} \sim S_{G6}$. The gate lines $G_1 \sim G_6$ transmit the scan signals $S_{G1} \sim S_{G6}$ to the pixel units $P_{11} \sim P_{94}$.

In this embodiment, the gate driver 330 sequentially asserts the scan signals $S_{G1} \sim S_{G6}$. The gate driver 330 asserts one of the scan signals $S_{G1} \sim S_{G6}$ each time. For example, when the gate driver 330 asserts the scan signal $S_{G1}$, the gate driver 330 un-asserts the scan signals $S_{G2} \sim S_{G6}$. Further, the gate driver 330 again asserts the scan signal $S_{G1}$ after asserting the scan signal $S_{G6}$.

The data driver 350 of the display circuit 131 provides a plurality of data signals to a plurality of data lines according to the vertical synchronization signal Hsync and the image signal $S_{IM}$. The disclosure does not limit the number of the data lines. For the pixel units $P_{11} \sim P_{94}$ shown in FIG. 2, FIG. 3 shows data lines $D_1 \sim D_6$ and data signals $S_{D1} \sim S_{D6}$. The data lines $D_1 \sim D_6$ transmits the data signals $S_{D1} \sim S_{D6}$ to the pixel units $P_{11} \sim P_{94}$.

In this embodiment, the driving signals $S_{DR}$ shown in FIG. 1 comprise the scan signals provided by the gate driver 330 and the data signals provided by the data driver 350. In one embodiment, the data driver 350 simultaneously provides the data signal $S_{D1} \sim S_{D6}$ to the data lines $D_1 \sim D_6$. In another embodiment, the data driver 350 sequentially provides the data signal $S_{D1} \sim S_{D6}$ to the data lines $D_1 \sim D_6$.

Before the gate driver 330 asserts one scan signal, the gate driver 330 stops asserting any scan signals. At this time, the data driver 350 also stops providing any data signals. Thus, sensing circuit 137 starts detecting the touch panel 133. The sensing circuit 137 obtains the position of the touched area of the touch panel 133 according to the detection result. The host unit 110 executes the corresponding function according to the obtained result.

Figure 4:
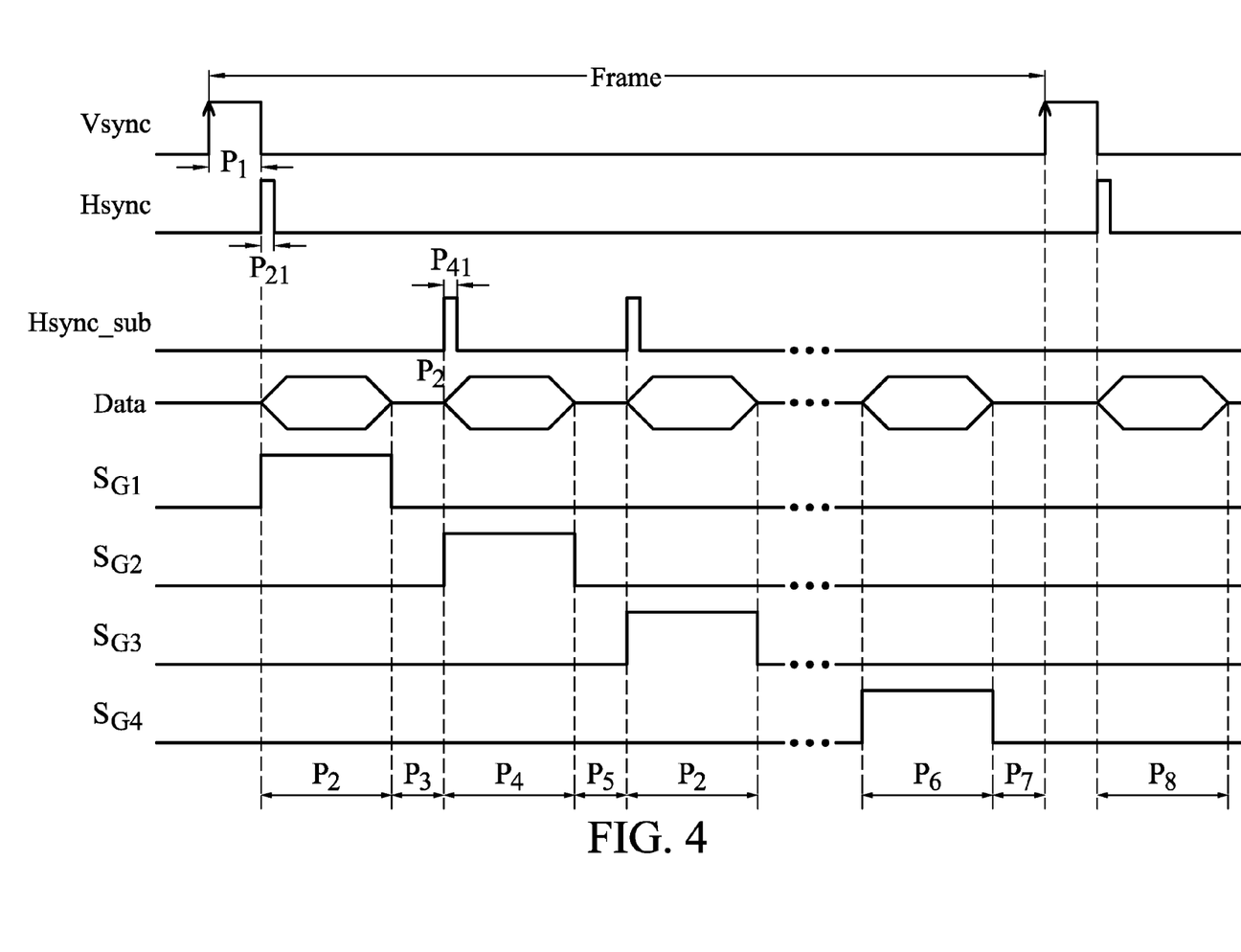
FIG. 4 is a timing chart of an exemplary embodiment of a control method of the disclosure.

FIG. 4 is a timing chart of an exemplary embodiment of a control method of the disclosure. During the period $P_1$, the timing controller 310 asserts the vertical synchronization signal Vsync. Thus, the gate driver 330 asserts the scan signal $S_{G1}$ during the period $P_2$.

During the period $P_{21}$, the timing controller 310 asserts the horizontal synchronization signal Hsync. Accordingly, the data signal 350 generates the data signals $S_{D1} \sim S_{D6}$. In this embodiment, the symbol Data represents the data signals $S_{D1} \sim S_{D6}$.

After the gate driver 330 asserts the scan signal $S_{G1}$ and before the gate driver 330 asserts the scan signal $S_{G2}$, the gate driver 330 does not assert any scan signal. At this time (e.g. the period $P_3$), the data driver 350 stops generating any data signals. Thus, the detection circuit 135 asserts the control signal $S_{ACT}$ shown in FIG. 1.

During the period $P_3$, the sensing circuit 137 detects the touch panel 133 and transmits the detection result to the host unit 110. Since the gate driver 330 stops asserting any scan signal and the data driver 350 stops generating any data signal, the detection result of the sensing circuit 137 is not influenced by the asserted scan signal or the asserted data signals.

During the period $P_4$, the gate driver 330 asserts the scan signal $S_{G2}$. At this time, the data driver 350 generates the data signals according to a sub-horizontal synchronization signal Hsync_sub. In one embodiment, the sub-horizontal synchronization signal Hsync_sub is generated by the data driver 350. During the period $P_4$, the gate driver 330 asserts the scan signal $S_{G2}$ and the data driver 350 generates the data signals. Thus, the detection circuit 135 stops asserting the control signal $S_{ACT}$.

During the period $P_5$, the gate driver 330 does not assert any scan signal and the data driver 350 stops generating any data signal. Thus, the detection circuit 135 again asserts the control signal $S_{ACT}$ shown in FIG. 1.

During the period $P_6$, the gate driver 330 asserts the scan signal $S_{G6}$ and the data driver 350 generates the data signals to the data lines $D_1 \sim D_6$. Accordingly, the sensing circuit 137 stops detecting the touch panel 133.

During the period $P_7$, the gate driver 330 does not assert any scan signal and the data driver 350 stops generating any data signal. Thus, the detection circuit 135 again asserts the control signal $S_{ACT}$ shown in FIG. 1. During the period $P_8$, the gate driver 330 again asserts the scan signal $S_{G1}$.

In one embodiment, the frequency of the vertical synchronization signal Vsync is approximately 60 Hz, but the disclosure is not limited thereto. In one embodiment, frame time shown in FIG. 4 is approximately 1/60 sec.

The detection circuit 135 shown in FIG. 1 asserts the control signal $S_{ACT}$ according to one or a combination of the vertical synchronization signal Vsync, the horizontal synchronization signal Hsync, and the sub-horizontal synchronization signal Hsync_sub. When the control signal $S_{ACT}$ is asserted, the sensing circuit 137 starts detecting the touch panel 133.

In this embodiment, one or a combination of the vertical synchronization signal Vsync, the horizontal synchronization signal Hsync, and the sub-horizontal synchronization signal Hsync_sub is utilized to obtain the period in which the gate driver 330 stops generating the scan signals and to obtain the period in which the data driver 350 stops generating the data signals. At this time, if the sensing circuit 137 detects the touch panel 133, the accuracy and the signal-to-noise ratio (SNR) of the detection result of the sensing circuit 137 are increased.

Figure 5:
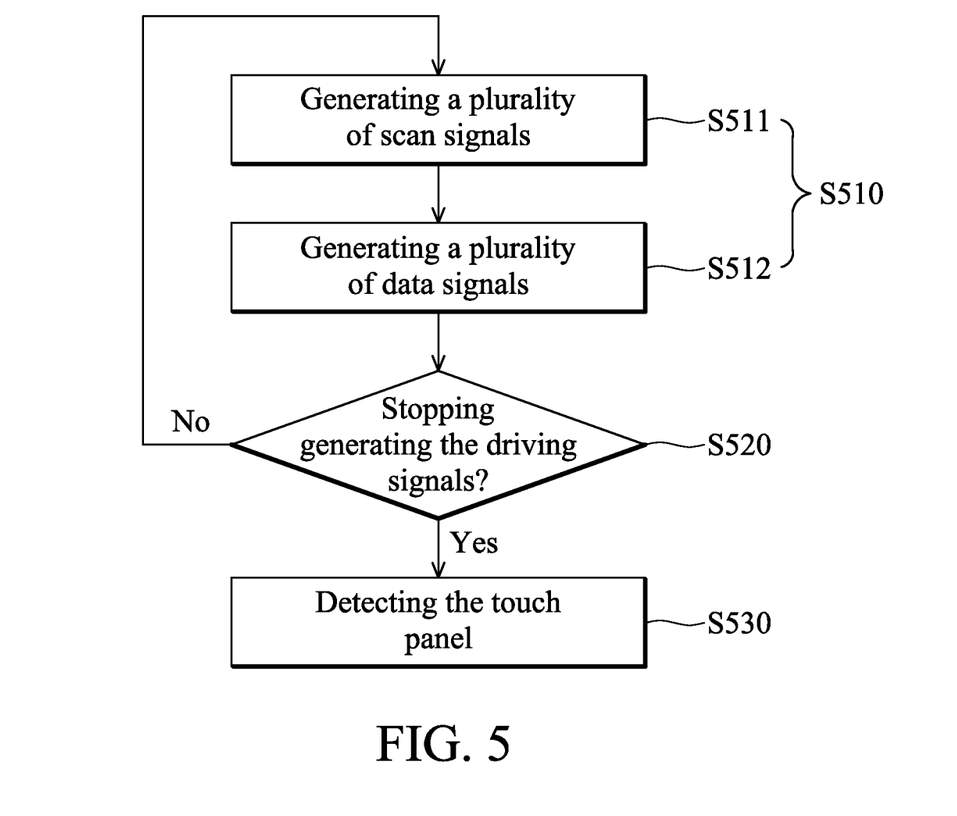
FIG. 5 is a schematic diagram of an exemplary embodiment of a control method of the disclosure.

FIG. 5 is a schematic diagram of an exemplary embodiment of a control method of the disclosure. The control method is applied in a touch panel. In one embodiment, a film comprising sensors is disposed on a display panel to form the touch panel. In another embodiment, the sensors are integrated with the display panel.

A plurality of driving signals are generated to the touch panel (step S510). Thus, the touch panel displays a corresponding image according to the driving signals. In this embodiment, the driving signals are generated by a display circuit. In one embodiment, the display circuit comprises a gate driver and a data driver. In this case, the driving signals comprise a plurality of scan signals and a plurality of data signals. The scan signals are generated by the gate driver. The data signals are generated by the data driver.

In this embodiment, step S510 comprises steps S511 and S512. In the step S511, a plurality of scan signals are generated. In step S512, a plurality of data signals are generated. In one embodiment, the scan signals are generated by the gate driver. The data signals are generated by the data driver.

The display circuit determines whether to stop generating the driving signals (step S520). In one embodiment, the display circuit comprises a gate driver and a data driver. The gate driver sequentially asserts the scan signals according to a vertical synchronization signal. Thus, the vertical synchronization signal is detected to obtain whether the gate driver stops asserting one of the scan signals and obtain whether the display circuit stops generating the driving signals.

Further, the data driver generates data signals according to a horizontal synchronization signal. Accordingly, the horizontal synchronization signal is detected to obtain whether the data driver stops generating the data signals. In one embodiment, the horizontal synchronization signal and the vertical synchronization signal are generated by a timing controller.

If the display circuit does not stop generating the driving signals then step S510 is executed. If the display circuit stops generating the driving signals, the touch panel is detected to obtain whether the touch panel is touched and to obtain the touched position (step S530). In one embodiment, when the gate driver stops asserting one of the scan signals and the data driver stops generating the data signals, the touch panel is detected to obtain whether the touch panel is touched and to obtain the touched position.

The disclosure does not limit the method of detecting the touch panel. In one embodiment, the touch panel is divided into various sensing areas. The sensing areas are sequentially detected to obtain the touch sensing area. In one embodiment, at least one of the sensing areas is detected each time.

The touch sensing area is obtained according to the change in the levels of the electric properties of the sensors of the sensing areas. For example, if the sensors of the sensing area are capacitors, the touch sensing area is obtained according to the changed capacitance of the capacitors. In other embodiments, the sensors of the sensing area are resistors.

Since the period in which the sensing circuit detects the touch panel does not overlap with the period in which the display circuit drives the touch panel, the detection result is not influenced by the driving signals and the SNR of the detection result is increased.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A display device, comprising:
a display circuit generating a plurality of driving signals;
a touch panel displaying an image according to the driving signals;
a detection circuit detecting the display circuit, wherein when the display circuit stops generating the driving signals, the detection circuit asserts a control signal;

a sensing circuit detecting the touch panel to obtain whether an area of the touch panel is touched when the control signal is asserted;

a timing controller providing a horizontal synchronization signal and a vertical synchronization signal;

a gate driver generating a plurality of scan signals according to the vertical synchronization signal, wherein the detection circuit does not control the scan signals; and a data driver generating a plurality of data signals according to the horizontal synchronization signal, wherein the driving signals comprise the scan signals and the data signals, wherein the detection circuit utilizes the horizontal synchronization signal and the vertical synchronization signal to determine that the display circuit has stopped generating the driving signals.

2. The display device as claimed in claim 1, wherein the touch panel comprises:

a first gate line transmitting a first scan signal among the scan signals; and a second gate line transmitting a second scan signal among the scan signals, wherein when the gate driver asserts the first scan signal, the gate driver un-asserts the second scan signal, and when the gate driver asserts the second scan signal, the gate driver un-asserts the first scan signal.

3. The display device as claimed in claim 2, wherein when the asserted first scan signal is transmitted by the first gate line and the asserted second scan signal is not transmitted by the second gate line, the sensing circuit asserts the control signal.

4. The display device as claimed in claim 2, wherein:

after the asserted first scan signal is transmitted by the first gate line, the second gate line transmits the asserted second scan signal; and after the asserted second scan signal is transmitted by the second gate line, the asserted first gate line transmits the first scan signal.

5. The display device as claimed in claim 4, wherein when the asserted second scan signal is transmitted by the second gate line and the asserted first scan signal is not transmitted by the first gate line, the sensing circuit asserts the control signal.

6. The display device as claimed in claim 1, wherein the touch panel comprises a plurality of sensor, which, when the area is touched, the electric property of a portion of sensors is changed, the portion of sensors correspond to the area, the sensing circuit obtains that the area is touched according to the changed in the electric property.

7. The display device as claimed in claim 6, wherein the sensors are a plurality of capacitors, when the area is touched, capacitance of a portion of the capacitors is changed, and wherein the portion of the capacitors corresponds to the area.

8. The display device as claimed in claim 6, wherein the sensors are a plurality of resistors, when the area is touched, the voltage difference of a portion of the resistors is changed, and wherein the portion of the resistors corresponds to the area.

9. The display device as claimed in claim 6, wherein the touch panel comprises a plurality of sensing areas, and each of the sensing areas corresponds to at least one pixel unit and comprises one of the sensors.

10. The display device as claimed in claim 9, wherein the sensing circuit detects the changed levels of the electric properties of sensors each time.

11. The display device as claimed in claim 9, wherein the sensing circuit detects at least one of the changed levels of the electric properties of sensors each time.

12. The display device as claimed in claim 1, wherein the touch panel comprises a plurality of pixel units, and each of the pixel units comprises a luminous element.

13. The display device as claimed in claim 12, wherein the luminous element is a light-emitting diode (LED).

14. The display device as claimed in claim 13, wherein the luminous element is an organic LED.

15. The display device as claimed in claim 1, wherein the touch panel comprises a plurality of pixel units, and each of the pixel units comprises a liquid crystal component.

16. The display device as claimed in claim 15, wherein the liquid crystal component is a cholesteric liquid crystal.

17. An electronic system, comprising:

a host unit providing an image signal; and a display device comprising:

a display circuit generating a plurality of driving signals according to the image signal;

a touch panel displaying an image according to the driving signals;

a detection circuit detecting the display circuit, wherein when the display circuit stops generating the driving signals, the detection circuit asserts a control signal;

a sensing circuit detecting the touch panel and transmitting the detection result to the host unit when the control signal is asserted, wherein the host unit executes a corresponding function according to the detection result;

a timing controller providing a horizontal synchronization signal and a vertical synchronization signal;

a gate driver generating a plurality of scan signals according to the vertical synchronization signal, wherein the detection circuit does not control the scan signals; and a data driver generating a plurality of data signals according to the horizontal synchronization signal, wherein the driving signals comprise the scan signals and the data signals, wherein the detection circuit utilizes the horizontal synchronization signal and the vertical synchronization signal to obtain that the display circuit stops generating the driving signals.

18. The electronic system as claimed in claim 17, wherein the touch panel comprises:

a first gate line transmitting a first scan signal among the scan signals; and a second gate line transmitting a second scan signal among the scan signals, wherein when the gate driver asserts the first scan signal, the gate driver un-asserts the second scan signal, and when the gate driver asserts the second scan signal, the gate driver un-asserts the first scan signal.

19. The electronic system as claimed in claim 18, wherein when the asserted first scan signal is transmitted by the first gate line and the asserted second scan signal is not transmitted by the second gate line, the sensing circuit asserts the control signal.

20. The electronic system as claimed in claim 18, wherein:

after the asserted first scan signal is transmitted by the first gate line, the second gate line transmits the asserted second scan signal; and after the asserted second scan signal is transmitted by the second gate line, the asserted first gate line transmits the first scan signal.

21. The electronic system as claimed in claim 20, wherein when the asserted second scan signal is transmitted by the second gate line and the asserted first scan signal is not transmitted by the first gate line, the sensing circuit asserts the control signal.

22. The electronic system as claimed in claim 17, wherein the touch panel comprises a plurality of sensor, when an area is touched, an electric property of a portion of sensors is changed, the portion of sensors corresponds to the touched area, the sensing circuit obtains that the area is touched according to the changed level of the electric property.

23. The electronic system as claimed in claim 22, wherein the sensors are a plurality of capacitors, when the area is touched, capacitance of a portion of the capacitors is changed, and wherein the portion of the capacitors corresponds to the area.

24. The electronic system as claimed in claim 22, wherein the sensors are a plurality of resistors, when the area is touched, the voltage difference of a portion of the resistors is changed, and wherein the portion of the resistors corresponds to the area.

25. The electronic system as claimed in claim 22, wherein the touch panel comprises a plurality of sensing areas, and each of the sensing areas corresponds to at least one pixel unit and comprises one of the sensors.

26. The electronic system as claimed in claim 25, wherein the sensing circuit detects the changed levels of the electric properties of sensors each time.

27. The electronic system as claimed in claim 25, wherein the sensing circuit detects at least one of the changed levels of the electric properties of sensors each time.

28. The electronic system as claimed in claim 17, wherein the touch panel comprises a plurality of pixel units, and each of the pixel units comprises a luminous element.

29. The electronic system as claimed in claim 28, wherein the luminous element is a light-emitting diode (LED).

30. The electronic system as claimed in claim 29, wherein the luminous element is an organic LED.

31. The electronic system as claimed in claim 17, wherein the touch panel comprises a plurality of pixel units, and each of the pixel units comprises a liquid crystal component.

32. The electronic system as claimed in claim 31, wherein the liquid crystal component is a cholesteric liquid crystal.

33. A control method for a touch panel, comprising:
generating and providing a plurality of driving signals to the touch panel, wherein the touch panel displays a corresponding image according to the driving signals, and the driving signals are generated by a display circuit;
utilizing a detection circuit to determine whether the display circuit stops generating the driving signals;
detecting whether an area of the touch panel is touched when the display circuit stops generating the driving signals;
providing a gate driver to generate the scan signals;
providing a data driver to generate the data signals;
providing a vertical synchronization signal to activate the gate driver, wherein the detection circuit does not control the scan signals;
providing a horizontal synchronization signal to activate the data driver; and
utilizing the vertical synchronization signal and the horizontal synchronization signal to obtain whether the display circuit stops generating the driving signals.

34. The control method as claimed in claim 33, wherein the driving signals comprise a plurality of scan signals and a plurality of data signals.

35. The control method as claimed in claim 33, further comprising:
providing a timing controller to generate the vertical synchronization signal and the horizontal synchronization signal.

36. The control method as claimed in claim 33, further comprising:
dividing the touch panel into a plurality of sensing areas; and
sequentially detecting the sensing areas to obtain whether the area is touched.

37. The control method as claimed in claim 33, further comprising:
stopping the detection function when the display circuit generates the driving signals.

* * * * *